United States Patent
Yoshida et al.

(10) Patent No.: US 7,406,129 B2
(45) Date of Patent: Jul. 29, 2008

(54) WIRELESS COMMUNICATION APPARATUS AND WIRELESS COMMUNICATION SYSTEM

(75) Inventors: Shikio Yoshida, Nara (JP); Akiteru Deguchi, Yamatokoriyama (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 715 days.

(21) Appl. No.: 10/823,601

(22) Filed: Apr. 14, 2004

(65) Prior Publication Data

US 2004/0208255 A1   Oct. 21, 2004

(30) Foreign Application Priority Data

Apr. 15, 2003 (JP) .............................. 2003-110409

(51) Int. Cl.
*H04B 7/02* (2006.01)

(52) U.S. Cl. .................. 375/267; 375/260; 375/299; 375/347

(58) Field of Classification Search .................. 375/260, 375/267, 299, 376; 327/141, 147
See application file for complete search history.

(56) References Cited

U.S. PATENT DOCUMENTS

| | | | | |
|---|---|---|---|---|
| 6,151,372 A * | 11/2000 | Yamamoto | ................... | 375/347 |
| 6,700,865 B1 * | 3/2004 | Yamamoto et al. | ........... | 370/208 |
| 6,959,052 B2 * | 10/2005 | Harada et al. | ................ | 375/340 |
| 7,095,709 B2 * | 8/2006 | Walton et al. | ................ | 370/208 |
| 7,099,265 B2 * | 8/2006 | Kuwabara et al. | ........... | 370/203 |
| 7,142,828 B2 | 11/2006 | Dartois et al. | | |
| 7,221,645 B2 * | 5/2007 | Wang et al. | ................... | 370/203 |
| 2002/0176485 A1 * | 11/2002 | Hudson | ....................... | 375/144 |
| 2002/0191535 A1 * | 12/2002 | Sugiyama et al. | ........... | 370/208 |
| 2003/0123565 A1 * | 7/2003 | Fukuda et al. | ............... | 375/267 |
| 2003/0152159 A1 * | 8/2003 | Denno | ......................... | 375/267 |
| 2004/0032910 A1 * | 2/2004 | Horng et al. | ................. | 375/267 |
| 2004/0179626 A1 * | 9/2004 | Ketchum | ..................... | 375/265 |
| 2005/0157811 A1 * | 7/2005 | Bjerke et al. | ................ | 375/267 |

FOREIGN PATENT DOCUMENTS

| | | |
|---|---|---|
| EP | 1 301 003 A1 | 4/2003 |
| JP | 2000-036801 A | 2/2000 |
| JP | 3022865 B1 | 3/2000 |
| JP | 2000-174726 A | 6/2000 |
| JP | 2002-368661 A | 12/2002 |
| JP | 2003-110521 A | 4/2003 |
| JP | 2004-297142 A | 10/2004 |
| JP | 2005-523593 A | 8/2005 |

OTHER PUBLICATIONS

Multi-Carrier Multi-Antenna Group (http://bwrc.eecs.berkeley.edu/Research/MCMA/home.htm), Jul. 05, 2002.*

* cited by examiner

*Primary Examiner*—David C. Payne
*Assistant Examiner*—Leon-Viet Q Nguyen
(74) *Attorney, Agent, or Firm*—Birch, Stewart, Kolasch & Birch, LLP

(57) ABSTRACT

A data transmission apparatus transmits data signals "S1" and "S2" containing identical serial data "ds" in two frequency bands, and a data reception apparatus receives those data signals "S1" and "S2." Parallel data "dp1" and "dp12" obtained from the data signals "S1" and "S2" is subjected to selection or synthesis in a subcarrier selection/demodulation circuit so as to be demodulated into serial data "dsx," which is then outputted to a MAC section.

6 Claims, 12 Drawing Sheets

WIRELESS COMMUNICATION APPARATUS AND WIRELESS COMMUNICATION SYSTEM

This nonprovisional application claims priority under 35 U.S.C. § 119(a) on Patent Application No. 2003-110409 filed in Japan on Apr. 15, 2004, the entire contents of which are hereby incorporated by reference.

BACKGROUND OF THE INVENTION

1. Field of the Invention

The present invention relates to a wireless communication apparatus and a wireless communication system for performing wireless communication. More particularly, the present invention relates to a wireless communication apparatus and a wireless communication system that employ a multiple-carrier transmission method such as the OFDM (orthogonal frequency division multiplexing) method for transmitting AV streams and data on a wireless basis.

2. Description of the Prior Art

In recent years, as methods for transmitting data and AV streams on a wireless basis, among others, those complying with IEEE802.11b, using the 2.4 GHz band, and IEEE802.11a, using the 5.2 GHz band, have been becoming increasingly popular. Radio waves in the 2.4 GHz band tend to propagate less rectilinearly than those in the 5.2 GHz band, and this gives the former the advantage of readily propagating around the corners of a shielding object and the advantage of offering longer wireless transmission distances. However, the 2.4 GHz frequency band is used comparatively freely, and is shared by other communication methods such as Bluetooth and by the radio waves emitted from microwave ovens. Thus, in the 2.4 GHz frequency band, interference with such other microwaves tends to lower the effective throughput of communication.

Accordingly, in a case where the method complying with IEEE802.11b is used for data transmission such as file transfer in a wireless LAN (local area network), it is not absolutely necessary to guarantee any specific QoS (quality of service), i.e., to give a guarantee that a particular amount of data is transmitted within a particular length of time. Thus, interference with unrelated radio waves does not cause any problem. However, in a case where high-quality images and sounds are transmitted on a wireless basis, it is necessary to guarantee a certain QoS, and therefore interference with unrelated radio waves causes an unacceptable lowering of the effective throughput.

By contrast, the method complying with IEEE802.11a, which uses the 5.2 GHz band, adopts the OFDM method, and, by using a plurality of subcarriers spread over a wide frequency band, achieves a high physical transmission rate and a high effective throughput. Thus, this method creates a transmission state that offers efficiency high enough to guarantee a desired QoS. However, radio waves in the 5.2 GHz band tend to propagate more rectilinearly than those in the 2.4 GHz band, and this gives the former the disadvantage of less readily propagating around the corners of a shielding object and the disadvantage of offering shorter wireless transmission distances. Thus, in wireless transmission performed over a wide frequency band, when frequency-selective fading occurs due to factors in the indoor or outdoor transmission environment, reception condition may become poor with particular subcarriers only, resulting in the missing of the data transmitted by those subcarriers.

To prevent such missing of the data carried by a particular subcarrier, there has been conventionally proposed a diversity receiver wherein reception is achieved by the use of a plurality of antennas and, for each subcarrier, the signals received via the different antennas are corrected and then synthesized together, or a diversity receiver wherein, for each subcarrier, the signal strengths or the like of the signals received via a plurality of antennas are compared with one another so that a signal being received in good reception condition is selected and demodulated (see Japanese Patent Application Laid-Open No. 2000-36801). There has also been conventionally proposed a diversity receiver wherein a plurality of antennas are used and, for each subcarrier, the carrier levels of the signals received via the different antennas are checked so that a signal being received in good reception condition is selected (see Japanese Patent Application Laid-Open No. 2000-174726).

Thus, for example, in a case where the frequency band used is the 5.2 GHz band as with the method complying with IEEE802.11a, by using the diversity receiver proposed in one of the patent publications mentioned above, it is possible to receive OFDM signals via a plurality of antennas. Here, an attempt is made to prevent the deterioration of subcarriers by exploiting the differences in characteristics of the frequency-selective fading occurring in the individual OFDM signals received by the different antennas.

However, the diversity receivers proposed in the Japanese Patent Applications Laid-Open Nos. 2000-36801 and 2000-174726 mentioned above use only one frequency band, and therefore, when the plurality of antennas are arranged close to one another spatially, the signals received by the different antennas may show similar frequency-selective fading characteristics. In that case, the subcarriers of an identical frequency obtained from the OFDM signals received via those antennas exhibit similar degrees of deterioration. Thus, the result of synthesis of those subcarriers, or the result of comparison among and selection from them, may be less accurate than the results for other subcarriers.

In particular, in a case where OFDM signals in the 5.2 GHz band are received, when the plurality of antennas are arranged close to one another spatially, all the relevant radio waves may fail to propagate around in similar manners with respect to the different antennas, or may fail to reach the antennas due to the transmission loss that the radio waves in that frequency band inevitably suffer along the spatial transmission paths. This results in poor reception condition via all the antennas.

SUMMARY OF THE INVENTION

An object of the present invention is to provide a wireless communication apparatus that reduces the influence of frequency-selective fading by receiving an identical signal in a plurality of frequency bands and then synthesizing together or selecting from the signals received in the different frequency bands according to their respective reception condition. Another object of the present invention is to provide a wireless communication system built around such a wireless communication apparatus.

To achieve the above objects, according to one aspect of the present invention, a wireless communication apparatus is provided with: a modulation circuit that generates a plurality of data signals containing identical data each in one of a plurality of carrier frequency bands; and a plurality of antennas via which the plurality of data signals outputted from the modulation circuit are transmitted each in a corresponding one of the plurality of carrier frequency bands.

According to another aspect of the present invention, a wireless communication apparatus is provided with: a plurality of antennas via which are received data signals each transmitted in one of a plurality of carrier frequency bands; a plurality of frequency conversion circuits that convert the data signals received respectively via the plurality of antennas into a plurality of baseband signals having an identical frequency; and a demodulation circuit that, based on the plurality of baseband signals obtained respectively from the plurality of frequency conversion circuits, checks reception condition in the carrier frequency bands corresponding respectively to the plurality of data signals and selects the baseband signal obtained from the data signal in the carrier frequency band in which reception condition is found best and that then demodulates the thus selected baseband signal. Here, the data signals transmitted respectively in the plurality of carrier frequency bands contain identical data.

According to another aspect of the present invention, a wireless communication apparatus is provided with: a plurality of antennas via which are received data signals each transmitted in one of a plurality of carrier frequency bands; a plurality of frequency conversion circuits that convert the data signals received respectively via the plurality of antennas into a plurality of baseband signals having an identical frequency; and a demodulation circuit that synthesizes together the plurality of baseband signals obtained respectively from the plurality of frequency conversion circuits into a single baseband signal and that then demodulates the thus synthesized baseband signal. Here, the data signals transmitted respectively in the plurality of carrier frequency bands contain identical data.

According to another aspect of the present invention, a wireless communication apparatus is provided with: n (where n is an integer equal to or greater than 2) antennas via which are received data signals modulated by an OFDM modulation method and transmitted in n carrier frequency bands; n frequency conversion circuits that convert the data signals received respectively via the n antennas into baseband signals having an identical frequency; n Fourier transform circuits that, based on the plurality of baseband signals obtained respectively from the n frequency conversion circuits, generate parallel data containing data segments each relating to one of m (where m is an integer equal to or greater than 2) subcarriers; n data correction circuits that, based on the parallel data fed respectively from the n Fourier transform circuits, check reception condition of each of the m subcarriers in the respective carrier frequency bands and accordingly correct the parallel data; a data selection circuit that receives the n sets of parallel data corrected by the n data correction circuits and that then, for each of the m subcarriers, recognizes the carrier frequency band in which reception condition is best and that then selects the data in the thus recognized carrier frequency band so as to thereby newly generate parallel data containing m data segments; and a demodulation circuit that converts the parallel data newly generated by the data selection circuit into serial data. Here, the parallel data contained in the data signals transmitted respectively in the plurality of carrier frequency bands contains identical data.

According to another aspect of the present invention, a wireless communication apparatus is provided with: n (where n is an integer equal to or greater than 2) antennas via which are received data signals modulated by an OFDM modulation method and transmitted in n carrier frequency bands; n frequency conversion circuits that convert the data signals received respectively via the n antennas into baseband signals having an identical frequency; n Fourier transform circuits that, based on the plurality of baseband signals obtained respectively from the n frequency conversion circuits, generate parallel data containing data segments each relating to one of m (where m is an integer equal to or greater than 2) subcarriers; n data correction circuits that, based on the parallel data fed respectively from the n Fourier transform circuits, check reception condition of each of the m subcarriers in the respective carrier frequency bands and accordingly correct the parallel data; a data synthesis circuit that receives the n sets of parallel data corrected by the n data correction circuits and that then, for each of the m subcarriers, synthesizes the data so as to thereby newly generate parallel data containing m data segments; and a demodulation circuit that converts the parallel data newly generated by the data synthesis circuit into serial data. Here, the parallel data contained in the data signals transmitted respectively in the plurality of carrier frequency bands contains identical data.

According to another aspect of the present invention, a wireless communication apparatus is provided with: n (where n is an integer equal to or greater than 2) antennas via which are received data signals modulated by an OFDM modulation method and transmitted in n carrier frequency bands; n frequency conversion circuits that convert the data signals received respectively via the n antennas into baseband signals having an identical frequency; n Fourier transform circuits that, based on the plurality of baseband signals obtained respectively from the n frequency conversion circuits, generate parallel data containing data segments each relating to one of m (where m is an integer equal to or greater than 2) subcarriers; a data selection circuit that receives the n sets of parallel data obtained from the n Fourier transform circuits and that then, for each of the m subcarriers, recognizes the carrier frequency band in which reception condition is best and that then selects the data in the thus recognized carrier frequency band so as to thereby newly generate parallel data containing m data segments; a data correction circuit that, based on the parallel data newly generated by the data selection circuit, checks reception condition of each of the m subcarriers in the respective carrier frequency bands and accordingly correct the parallel data; and a demodulation circuit that converts the parallel data corrected by the data correction circuit into serial data. Here, the parallel data contained in the data signals transmitted respectively in the plurality of carrier frequency bands contains identical data.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Basic Configuration

Figure 1:
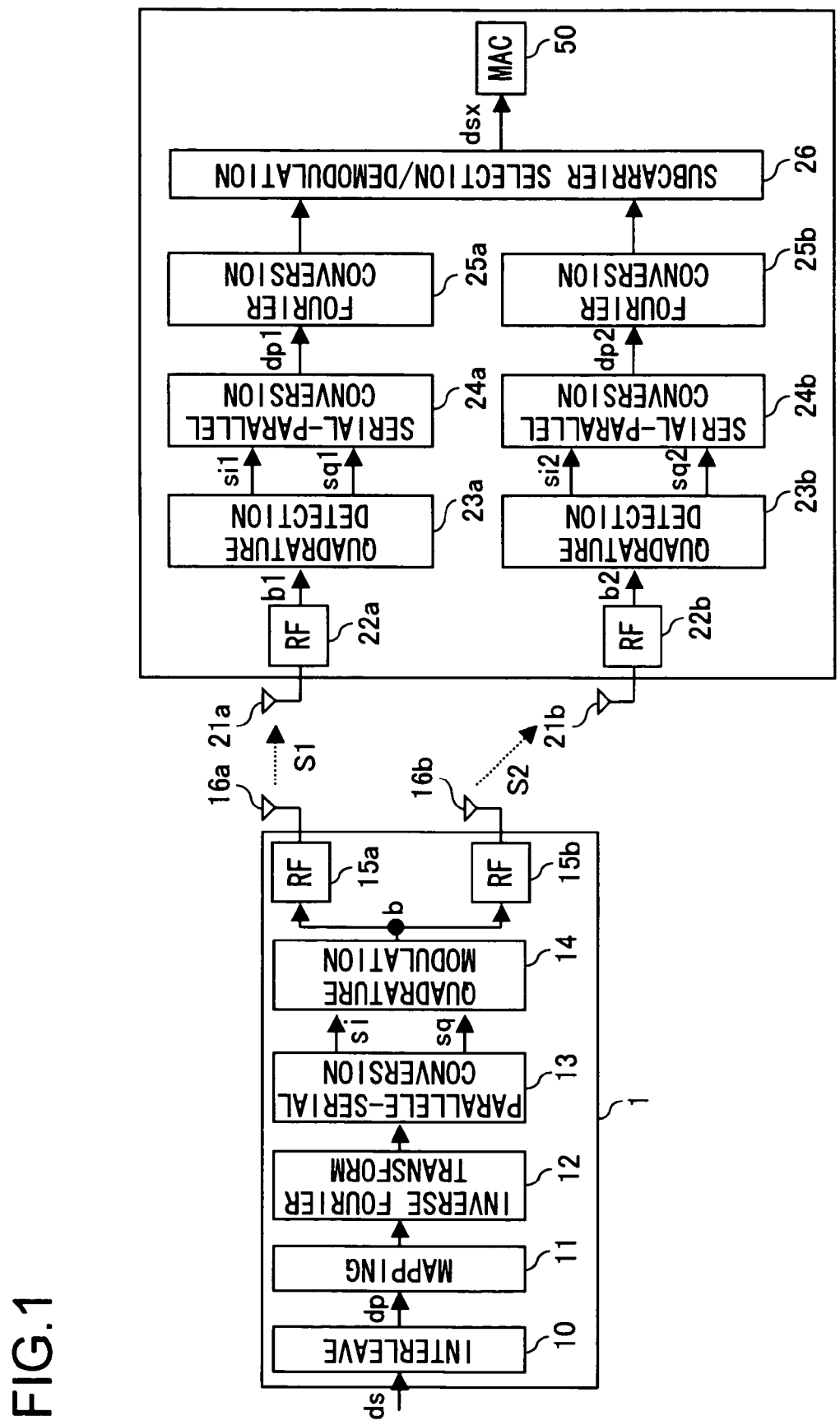
FIG. 1 is a block diagram showing the configuration of a wireless communication system according to the present invention.

The basic configuration according to the present invention will be described below with reference to the drawings. FIG. 1 is a block diagram showing the configuration of a wireless communication system according to the invention. The wireless communication system shown in FIG. 1 is provided with: a data transmission apparatus 1 that modulates inputted data by the OFDM method and that then transmits the modulated data; and a data reception apparatus 2 that receives the data signal transmitted from the data transmission apparatus 1 and that then outputs the data obtained by demodulating the data signal by the OFDM method. This wireless communication system composed of the data transmission apparatus 1 and the data reception apparatus 2 use two frequency bands, namely the 2.4 GHz and 5.2 GHz bands, and identical data signals are transmitted in both the 2.4 GHz and 5.2 GHz frequency bands.

In this wireless communication system, the data transmission apparatus 1 is provided with: an interleave circuit 10 that generates parallel data by dividing inputted serial data into segments of data of which the number is equal to the number of subcarriers; a mapping circuit 11 that performs mapping in a fashion conforming to the QAM (quadratic amplitude modulation), QPSK (quadruple phase shift keying), or other method; an inverse Fourier transform circuit 12 that performs inverse Fourier transform on the parallel data generated by the mapping circuit 11; a parallel-to-serial conversion circuit 13 that synthesizes together the parallel data subjected to inverse Fourier transform by the inverse Fourier transform circuit 12 to generate two quadrature signals called an I and a Q signal; a quadrature modulation circuit 14 that performs quadrature modulation on the I and Q signals from the parallel-to-serial conversion circuit 13 to generate a baseband signal; an RF circuit 15a that performs frequency conversion on the baseband signal from the quadrature modulation circuit 14 to convert it into a high-frequency signal in the 2.4 GHz band; an RF circuit 15b that performs frequency conversion on the baseband signal from the quadrature modulation circuit 14 to convert it into a high-frequency signal in the 5.2 GHz band; and antennas 16a and 16b via which the high-frequency signals from the RF circuits 15a and 15b are transmitted.

On the other hand, the data reception apparatus 2 is provided with: antennas 21a and 21b via which high-frequency signals in the 2.4 GHz and 5.2 GHz, respectively, are received; RF circuits 22a and 22b that perform frequency conversion on the high-frequency signals received via the antennas 21a and 21b, respectively, to convert them into baseband signals; quadrature detection circuits 23a and 23b that perform quadrature detection on the baseband signals from the RF circuits 22a and 22b, respectively, by using two local oscillation signals 90° out of phase with each other to produce an I and a Q signal; serial-to-parallel conversion circuits 24a and 24b that generate parallel data from the I and Q signals from the quadrature detection circuits 23a and 23b; Fourier transform circuits 25a and 25b that perform fast Fourier transform on the parallel data obtained from the serial-to-parallel conversion circuits 24a and 24b; a subcarrier selection/demodulation circuit 26 that receives the parallel data subjected to Fourier transform by the Fourier transform circuit 25a and 25b, respectively, and that then, for each subcarrier, selects data in good condition in order to generate serial data from the thus selected parallel data; and a MAC section 50 that checks the MAC (medial access control) frames in the serial data from the subcarrier selection/demodulation circuit 26 to perform synchronism control and other operations.

Configured as described above, the data transmission apparatus 1 and the data reception apparatus 2 operate as follows. First, in the data transmission apparatus 1, the interleave circuit 10 generates parallel data "dp" by dividing serial data "ds" into segments of data of which the number is equal to the number of subcarriers in such a way that no temporally consecutive parts of the data are allotted to adjacent subcarriers. Then, the mapping circuit 11 modulates individually the segments of the parallel data "dp" allotted to the different subcarriers in a fashion conforming to the QAM, QPSK, or other method. Thereafter, the parallel data "dp" modulated by the mapping circuit 11 is subjected to inverse Fourier transform performed by the inverse Fourier transform circuit 12. The parallel data "dp" is then fed to the parallel-to-serial conversion circuit 13 so as to be converted into two signals, namely an I signal "si" and a Q signal "sq," which are then subjected to quadrature modulation by the quadrature modulation circuit 14 so as to be converted into a single signal, namely a baseband signal "b."

This baseband signal "b" is fed to both the RF circuits 15a and 15b, which thus generate high-frequency signals "S1" and "S2," respectively, containing the same data. These high-frequency signals "S1" and "S2" are then transmitted via the antenna 16a and 16b in their respective carrier frequency bands, namely the 2.4 GHz and 5.2 GHz bands. In this way, two high-frequency signals "S1" and "S2" generated from identical serial data "ds" are transmitted in the 2.4 GHz and 5.2 GHz carrier frequency bands, respectively.

Then, in the data reception apparatus 2, the high-frequency signal "S1" transmitted in the 2.4 GHz carrier frequency band is received via the antenna 21a, and the high-frequency signal "S2" transmitted in the 5.2 GHz carrier frequency band is received via the antenna 21b. The high-frequency signal "S1" received via the antenna 21a is converted by the RF circuit 22a into a baseband signal "b1," which is then converted by the quadrature detection circuit 23a into an I signal "si1" and a Q signal "sq1." The I and Q signals "si1" and "sq1" originating from the high-frequency signal "S1" are fed to the serial-to-parallel conversion circuit 24a so as to be converted into parallel data "dp1" containing different segments of data for different subcarriers, and then this parallel data "dp1" is subjected to Fourier transform performed by the Fourier transform circuit 25a.

On the other hand, the high-frequency signal "S2" received via the antenna 21b is converted by the RF circuit 22b into a baseband signal "b2" having the same frequency as the baseband signal "b1," and this baseband signal "b2" is then converted by the quadrature detection circuit 23b into an I signal "si2" and a Q signal "sq2." The I and Q signals "si2" and "sq2" originating from the high-frequency signal "S2" are fed to the serial-to-parallel conversion circuit 24b so as to be converted into parallel data "dp2" containing different segments of data for different subcarriers, and then this parallel data "dp2" is subjected to Fourier transform performed by the Fourier transform circuit 25b.

The parallel data "dp1" and "dp2" subjected to Fourier transform by the Fourier transform circuits 25a and 25b, respectively, is then fed to the subcarrier selection/demodulation circuit 26. With respect to the parallel data "dp1" and "dp2" obtained by receiving the high-frequency signals "S1" and "S2" generated from the identical serial data "ds," the subcarrier selection/demodulation circuit 26 first corrects those data for the influence of their respective transmission paths on the basis of the reception condition of the individual subcarriers, and then either selects from or synthesize together, for each subcarrier, the corresponding segments contained in the parallel data "dp1" and "dp2."

Specifically, in a case where data received in good condition is selected, for example, when the parallel data "dp1" is received in good condition in a subcarrier having a frequency "fx" and the parallel data "dp2" is received in good condition in a subcarrier having a frequency "fy," as the data of the subcarrier having the frequency "fx" is used that contained in the parallel data "dp1," and as the data of the subcarrier having the frequency "fy" is used that contained in the parallel data "dp2." In a case where data is synthesized, for each subcarrier, the corresponding segments are synthesized together according to their values. Then, the parallel data "dpx" obtained through selection or synthesis performed for each subcarrier is converted into serial data "dsx" containing less errors, and this serial data "dsx" is outputted to the MAC section 50.

The embodiments described hereinafter all deal with a wireless communication system of which the basic configuration is as shown in FIG. 1. In all the embodiments, the data transmission apparatus 1 has the same configuration. Accordingly, in the following descriptions of the individual embodiments, the configuration of the data reception apparatus 2 will mainly be discussed, with emphasis placed on its subcarrier selection/demodulation circuit 26, whose configuration varies from one embodiment to another.

First Embodiment

Figure 2:
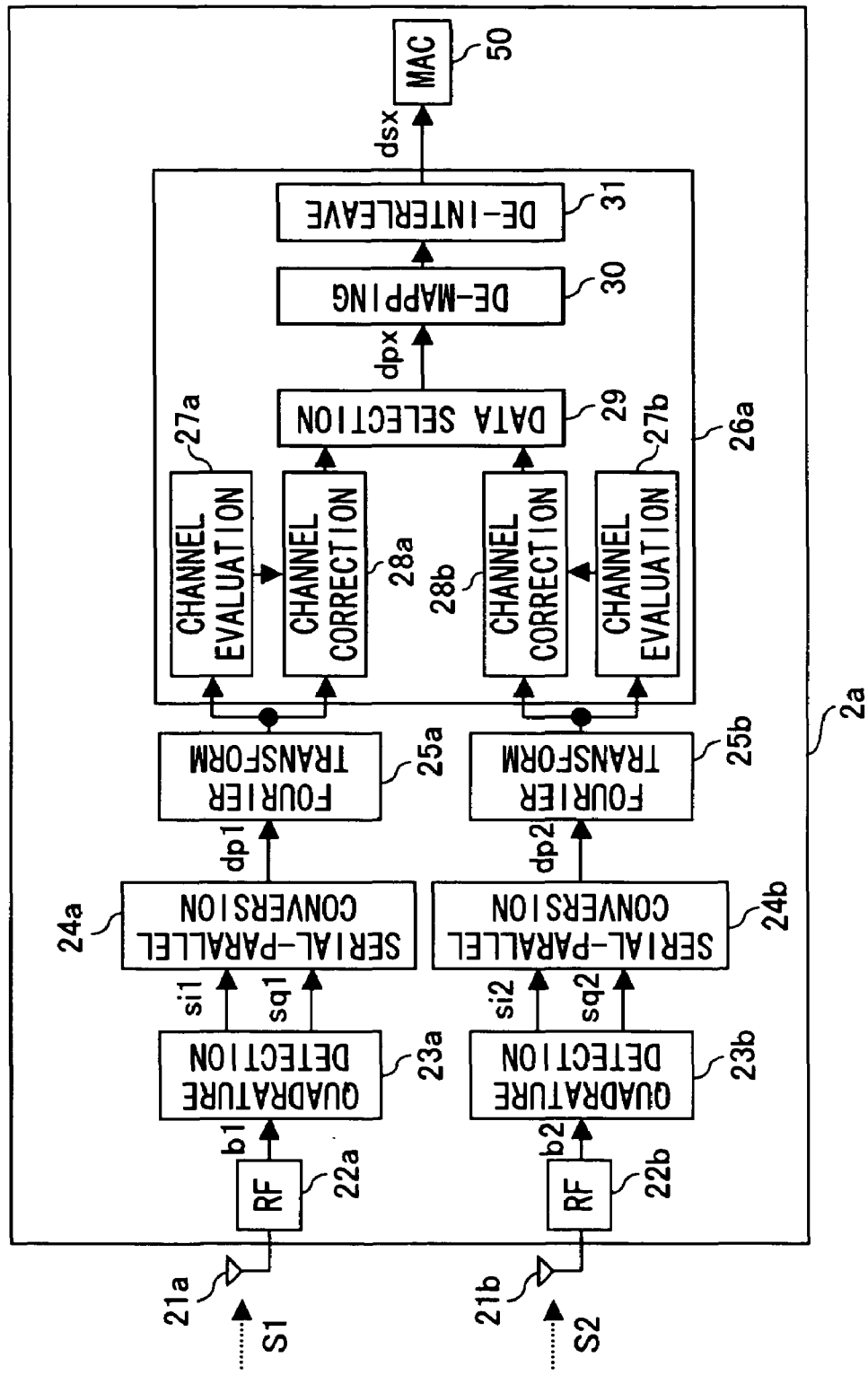
FIG. 2 is a block diagram showing the configuration of the data reception apparatus of a first embodiment of the invention.

A first embodiment of the invention will be described below with reference to the drawings. FIG. 2 is a block diagram showing the internal configuration of the data reception apparatus used in the wireless communication system of this embodiment.

In the data reception apparatus 2a shown in FIG. 2 (corresponding to the data reception apparatus 2 shown in FIG. 1), the subcarrier selection/demodulation circuit 26a (corresponding to the subcarrier selection/demodulation circuit 26 shown in FIG. 1) is provided with: channel evaluation circuits 27a and 27b that predict, for each subcarrier, the influence of the transmission path of the corresponding frequency channel on the parallel data "dp1" and "dp2" fed respectively from the Fourier transform circuits 25a and 25b and that then generate influence correction information for correcting for the influence of the transmission path; channel correction circuits 28a and 28b that correct the parallel data "dp1" and "dp2" fed respectively from the Fourier transform circuits 25a and 25b for the influence of the transmission path of the subcarrier channel on the basis of the influence correction information from the channel evaluation circuits 27a and 27b; a data selection circuit 29 that compares, for each subcarrier, the parallel data "dp1" and "dp2" for which the subcarriers are corrected by the channel correction circuits 28a and 28b in order to select the subcarriers being received in good condition and thereby newly generate parallel data "dpx"; and a de-mapping circuit 30 that performs, for each subcarrier, de-mapping on the parallel data "dpx" selected by the data selection circuit 29 in a fashion conforming to the QAM, QPSK, or other method; and a de-interleave circuit 31 that generates serial data "dsx" from the parallel data "dpx" demodulated by the de-mapping circuit 30.

Configured as described above, the data reception apparatus 2a operates as follows. As described earlier in connection with the basic configuration, the data reception apparatus 2a receives via the antenna 21a the high-frequency signal "S1" transmitted in the 2.4 GHz carrier frequency band, and receives via the antenna 21b the high-frequency signal "S2" transmitted in the 5.2 GHz carrier frequency band. Thereafter, the high-frequency signal "S1" received via the antenna 21a is, through the RF circuit 22a, quadrature detection circuit 23a, serial-to-parallel conversion circuit 24a, and Fourier transform circuit 25a, converted into parallel data "dp1," which is then fed to the subcarrier selection/demodulation circuit 26a. On the other hand, the high-frequency signal "S2" received via the antenna 21b is, through the RF circuit 22b, quadrature detection circuit 23b, serial-to-parallel conversion circuit 24b, and Fourier transform circuit 25b, converted into parallel data "dp2," which is then fed to the subcarrier selection/demodulation circuit 26a.

In the subcarrier selection/demodulation circuit 26a, the parallel data "dp1" from the Fourier transform circuit 25a is fed to the channel evaluation circuit 27a and the channel correction circuit 28a, and the parallel data "dp2" from the Fourier transform circuit 25b is fed to the channel evaluation circuit 27b and the channel correction circuit 28b. The channel evaluation circuit 27a checks, for each subcarrier, the data contained in the parallel data "dp1" and thereby checks the transmission state of each subcarrier channel in the 2.4 GHz band, and the channel evaluation circuit 27b checks, for each subcarrier, the data contained in the parallel data "dp2" and thereby checks the transmitting state of each subcarrier channel in the 5.2 GHz band.

Here, let us assume that there are 48 subcarrier channels, and the parallel data "dp1" and "dp2" contains, as data for the individual subcarrier channels, data segments "dp1-1" to "dp1-48" and "dp2-1" to "dp2-48," respectively. Let us assume also that, in addition to the subcarriers, there are four pilot carriers, and, for the parallel data "dp1" and "dp2," pilot carrier data segments "p1-1" to "p1-4" and "p2-1" to "p2-4," respectively, are obtained.

With the parallel data "dp1" and "dp2" configured as described above, when the parallel data "dp1" is fed to the channel evaluation circuit 27a, the channel evaluation circuit 27a compares each of the data segments "dp1-1" to "dp1-48" with whichever of the pilot carrier data segments "p1-1" to "p1-4" is selected as being close to the corresponding sub carrier channel. Specifically, for the data segment "dp-m" ($1 \leq m \leq 48$), the pilot carrier "p1-x" ($1 \leq x \leq 4$) closest to the corresponding subcarrier channel is selected. Then, the data segment "dp-m" is compared with the pilot carrier "p1-x."

Figure 3A:
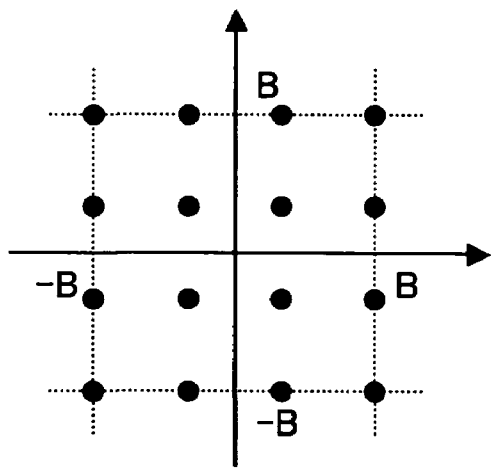
FIGS. 3A and 3B are diagrams illustrating the operation of the data correction circuit.

At this time, constellation information is also checked for each of the subcarrier channel data segments "dp1-1" to "dp1-48." Here, constellation information denotes the values of the phase and amplitude with which is modulated the subcarrier and to which is allocated each code corresponding to the data corresponding to the subcarrier, and is given as a point on a two-dimensional coordinate system with one axis representing the in-phase component (I signal) and the other the quadrature component (Q signal). Specifically, when the individual subcarrier data segments are modulated by the 16 QAM method, the constellation information of each subcarrier channel, when received normally, is as shown in FIG. 3A.

As a result of, with respect to each of the subcarrier channel data segments "dp1-1" to "dp1-48," constellation information being checked and comparison being made with the pilot carrier "p1-x" close thereto in this way, the reception condition of the individual subcarrier channels is recognized. On the basis of the thus recognized reception condition, deviations in the phase of the individual subcarriers and deviations in the amplitude thereof resulting from variations in reception signal strength are recognized, and influence correction information for correcting for those deviations in the phase and amplitude is generated for each of the data segments "dp1-1" to "dp1-48."

Figure 3B:
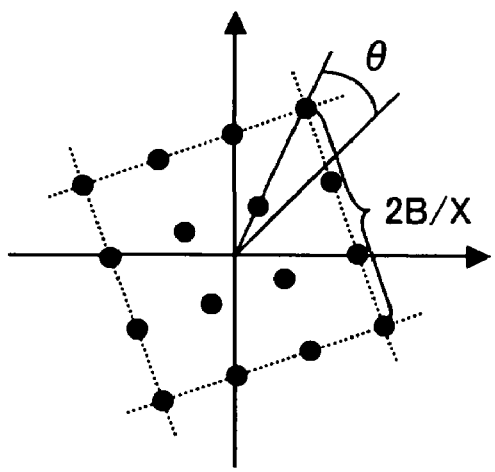

Specifically, for example, suppose that, when the reception condition of the subcarrier channel of the data segment "dp-m" is checked, the constellation information of the data segment "dp-m" is found to be represented as shown in FIG. 3B. In this case, as compared with when reception is normal as shown in FIG. 3A, it is recognized that the phase deviates by θ, and that the amplitude is 1/X times the amplitude B obtained when reception is normal. Accordingly, the influence correction information for the data segment "dp-m" is information that requests that, for the data segment "dp-m," the phase be rotated by –θ and the amplitude be multiplied by X.

Likewise, in the channel evaluation circuit 27b, as in the channel evaluation circuit 27a, when the parallel data "dp2" is fed thereto, the channel evaluation circuit 27b compares each of the data segments "dp2-1" to "dp2-48" with whichever of the pilot carrier data segments "pb2-1" to "pb2-4" is selected as being close thereto, and checks constellation information for each of the data segments "dp2-1" to "dp2-48" and thereby checks the reception condition of the individual subcarrier channels in the 5.2 GHz. After the reception condition of the individual subcarrier channels is checked, on the basis of the reception condition thus recognized, influence correction information is generated for each of the data segments "dp2-1" to "dp2-48."

The influence correction information thus generated by the channel evaluation circuits 27a and 27b is then fed to the channel correction circuits 28a and 28b, respectively. Thus, the channel correction circuit 28a corrects the individual data segments "dp1-1" to "dp1-48" on the basis of the influence correction information generated respectively for those data segments "dp1-1" to "dp1-48" by the channel evaluation circuit 27a. Specifically, with respect to the data segment "dp1-m" of which the constellation information is as shown in FIG. 3B, the phase is rotated by –θ and the amplitude is multiplied by X so that the data segment is corrected to one that gives a value close to the constellation information obtained when reception is normal as shown in FIG. 3A. Likewise, the channel correction circuit 28b corrects the individual data segments "dp2-1" to "dp2-48" on the basis of the influence correction information generated respectively for those data segments "dp2-1" to "d2-48" by the channel evaluation circuit 27b.

The parallel data "dp1" and "dp2" thus corrected with respect to each subcarrier by the channel correction circuits 28a and 28b is then fed to the data selection circuit 29. In the data selection circuit 29, the constellation information for the identical subcarrier in the parallel data "dp1" and "dp2" is checked and compared with the constellation information obtained when reception is normal. Then, for each of the subcarrier, the data segment closer to the constellation information obtained when reception is normal is selected, and thereby new parallel data "dpx" is generated.

Figure 4:
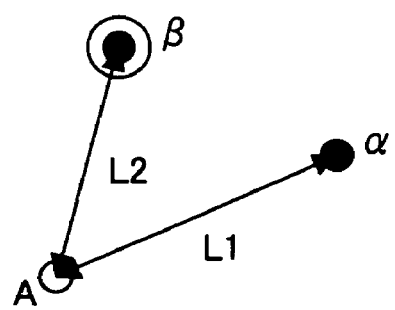
FIG. 4 is a diagram illustrating the operation of the data selection circuit.

Here, let us assume that, when the constellation information of the data segment "dp1-m" in the parallel data "dp1" and the constellation information of the data segment "dp2-m" in the parallel data "dp2" is checked, the corresponding positions on the two-dimensional coordinate system that shows signal point locations are points α and β in FIG. 4, respectively. Let us assume also that the position on the two-dimensional coordinate system that shows signal point locations as observed when reception is normal is point A. In this case, the distance between point A and point α and the distance between point A and point β are checked and compared.

When the relation between the distance L1 between positions A and α and the distance L2 between positions A and β is L1>L2, in the two-dimensional coordinate system that shows signal point locations, the constellation information that represents point β is found to be closer to the constellation information that represents point A than the constellation information that represents point α is. Accordingly, the data segment "dp2-m" in the parallel data "dp2," which has the constellation information that represents point β, is selected as the "dpx-m" of the parallel data "dpx."

Likewise, when the constellation information of the data segment "dp1-n" in the parallel data "dp1" and the constellation information of the data segment "dp2-n" in the parallel data "dp2" is checked, the relationship between the thus recognized constellation information and the constellation information obtained when reception is normal is checked on the two-dimensional coordinate system that shows signal point locations and is compared. If, on the two-dimensional coordinate system that shows signal point locations, the relationship between the constellation information of the data segment "dp1-n" in the parallel data "dp1" and the constellation information obtained when reception is normal is found to be closer, the data segment "dp1-m" in the parallel data "dp1" is selected as the "dpx-m" of the parallel data "dpx."

In this way, as the data segments "dpx-1" to "dpx-48" in the parallel data "dpx," whichever of the data segments "dp1-1" to "dp1-48" in the parallel data "dp1" and data segments "dp2-1" to "dp2-48" in the parallel data "dp2" have constellation information closer to that obtained when reception is normal are selected. Specifically, as the data segment contained in the parallel data "dpx" as corresponding to each subcarrier, whichever of the data segments contained in the parallel data "dp1" and "dp2" as corresponding to that subcarrier has constellation information closer to that obtained when reception is normal is selected. Accordingly, which of the parallel data "dp1" and "dp2" is selected differs from one subcarrier to another.

The parallel data "dpx" thus generated by selecting, for each subcarrier, the data segment that has constellation information closer to that obtained when reception is normal is then fed to the de-mapping circuit 30. The de-mapping circuit 30 performs demodulation for each of the subcarrier of the parallel data "dpx" in a fashion conforming to the QAM, QPSK, or other method. Specifically, when the individual subcarrier are modulated by the 16 QAM method, for each of the data segments "dpx-1" to "dpx-48" in the parallel data "dpx," on the basis of the two-dimensional coordinate system that shows signal point locations as shown in FIG. 3A, the four-bit code before being modulation by the data transmission apparatus 1 is recognized from the relationship of the phase and amplitude of that data segment, and the thus recognized four-bit code is demodulated.

The thus de-mapped parallel data "dpx" is then fed to the de-interleave circuit 31. Here, the codes represented by variations in the data of the individual subcarrier are connected together along the temporal axis in the order assigned to those subcarrier so as to generate serial data "dsx." That is, as a result of the data segments "dpx-1" to "dpx-48," each a four-bit code now as described above, being outputted in the order assigned respectively thereto from the de-interleave circuit 31, serial data "dsx" consisting of 4×48-bit codes is generated.

In this embodiment, for the parallel data obtained from two signals received in two frequency bands, constellation information is checked for each subcarrier so that constellation information closer to that obtained when reception is normal is selected. In this way, it is possible to reduce the influence of frequency-selective fading that affects the subcarrier individually.

Second Embodiment

Figure 5:
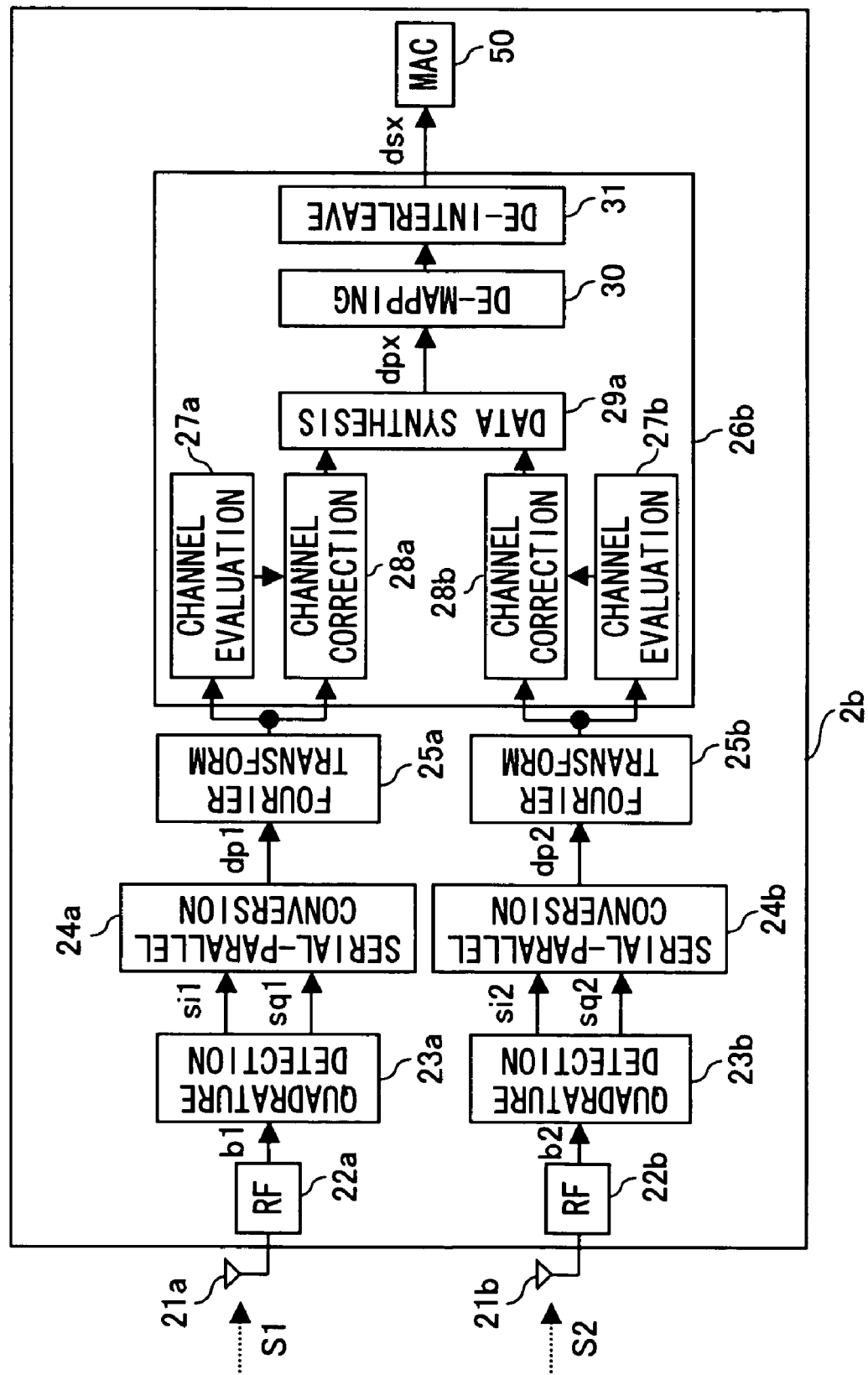
FIG. 5 is a block diagram showing the configuration of the data reception apparatus of a second embodiment of the invention.

A second embodiment of the invention will be described below with reference to the drawings. FIG. 5 is a block diagram showing the internal configuration of the data reception apparatus used in the wireless communication system of this embodiment. In the data reception apparatus shown in FIG. 5, such blocks as serve the same purposes as in the data reception apparatus shown in FIG. 2 are identified with the same reference numerals, and their detailed explanations will not be repeated.

In the data reception apparatus 2b shown in FIG. 5 (corresponding to the data reception apparatus 2 shown in FIG. 1), the subcarrier selection/demodulation circuit 26b (corresponding to the subcarrier selection/demodulation circuit 26 shown in FIG. 1) is provided with, in place of the data selection circuit 29 provided in the subcarrier selection/demodulation circuit 26a (FIG. 2), a data synthesis circuit 29a that generates parallel data "dpx" by synthesizing together, for each subcarrier, the parallel data "dp1" and "dp2" of which the individual subcarriers have been corrected by the channel correction circuits 28a and 28b. In other respects, the data reception apparatus 2b of this embodiment is provided with the same blocks as those provided in the data reception apparatus 2a of the first embodiment.

This data reception apparatus 2b provided with the data synthesis circuit 29a in this way operates as follows. First, as in the data reception apparatus 2a of the first embodiment, when a high-frequency signal "S1" in the 2.4 GHz band and a high-frequency signal "S2" in the 5.2 GHz band are received via the antennas 21a and 21b, respectively, they are, through the RF circuits 22a and 22b, quadrature detection circuits 23a and 23b, serial-to-parallel conversion circuits 24a and 24b, and Fourier transform circuits 25a and 25b, converted into parallel data "dp1" and "dp2," which is then fed to the subcarrier selection/demodulation circuit 26b.

In the subcarrier selection/demodulation circuit 26b, the parallel data "dp1" is fed to the channel evaluation circuit 27a and the channel correction circuit 28a so that the parallel data "dp1" is corrected with respect to each subcarrier in the channel correction circuit 28a on the basis of the influence correction information generated for each subcarrier in the channel evaluation circuit 27a. On the other hand, the parallel data "dp2" is fed to the channel evaluation circuit 27b and the channel correction circuit 28b so that the parallel data "dp2" is corrected with respect to each subcarrier in the channel correction circuit 28b on the basis of the influence correction information generated for each subcarrier in the channel evaluation circuit 27b.

Figure 6:
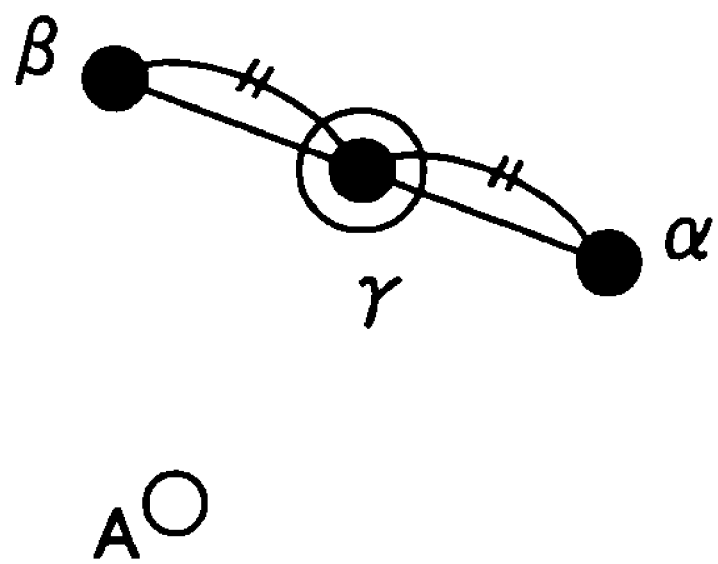
FIG. 6 is a diagram illustrating the operation of the data synthesis circuit.

The parallel data "dp1" and "dp2" thus corrected with respect to each subcarrier is then fed to the data synthesis circuit 29a. The data synthesis circuit 29a then synthesizes the data for the individual subcarriers on the basis of the constellation information for the identical subcarrier in the parallel data "dp1" and "dp2." The operation of this data synthesis circuit 29a will be described below with reference to FIG. 6. FIG. 6 is a diagram showing the coordinate positions, on the two-dimensional coordinate system that shows signal point locations, recognized from the constellation information of the data segment "dp1-m" in the parallel data "dp1" and the constellation information of the data segment "dp2-m" in the parallel data "dp2."

As in FIG. 4, in FIG. 6, let us assume that the position recognized from the constellation information of the data segment "dp1-m" in the parallel data "dp1" on the two-dimensional coordinate system that shows signal point locations is α, and that the position recognized from the constellation information of the data segment "dp2-m" in the parallel data "dp2" on the two-dimensional coordinate system that shows signal point locations is β. Let us assume also that the position observed when reception is normal on the two-dimensional coordinate system that shows signal point locations is point A.

In this case, the data synthesis circuit 29a synthesizes together the constellation information of the data segments "dp1-m" and "dp2-m" to calculate the constellation information corresponding to the coordinate position of point γ located at the midpoint between points α and β recognized on the two-dimensional coordinate system that shows signal point locations as shown in FIG. 6. Then, the data synthesis circuit 29a generates the data segment "dpx-m" in such a way that the constellation information of the data segment "dpx-m" corresponds to the coordinate position of point γ. That is, by using the coordinate positions recognized from the phase and amplitude of the subcarrier corresponding to the data segments "dp1-m" and "dp2-m" as obtained from the constellation information of the data segments "dp1-m" and "dp2-m," the coordinate position located at the midpoint between those coordinate positions is calculated, then the phase and amplitude of the subcarrier recognized from that coordinate position is recognized, and then the data segment dpx-m" is generated from the constellation information that represents those phase and amplitude.

In this way, as a result of the data segments "dp1-1" to "dp1-48" in the parallel data "dp1" and the data segments "dp2-1" to "dp2-4" in the parallel data "dp2" being synthesized together, the data segments "dpx-1" to "dpx-48" in the parallel data "dpx" are obtained as data corresponding to the mid positions between the positions represented by the data segments "dp1-1" to "dp1-48" in the parallel data "dp1" and the positions represented by the data segments "dp2-1" to "dp2-48" in the parallel data "dp2."

Thus, the data for the individual subcarriers in the parallel data "dpx" is generated by synthesizing together the data for those subcarriers in the parallel data "dp1" and "dp2." This makes the constellation information of the individual subcarriers of the parallel data "dpx" thus obtained through synthesis closer to the constellation information obtained when reception is normal. Thereafter, the parallel data "dpx" is, through the de-mapping circuit 30 and the de-interleave circuit 31, converted into serial data "dsx," which is then outputted.

In this embodiment, the parallel data obtained from two signals received in two frequency bands is synthesized together with respect to each subcarrier. This makes it possible to make the resulting constellation information closer to the constellation information obtained when reception is normal. Thus, it is possible to reduce the influence of frequency-selective fading that affects the subcarriers individually.

In this embodiment, when the data synthesis circuit generates the data for the individual subcarriers in the parallel data, for each subcarrier, the midpoint coordinate position between the two points corresponding to the two signals received in different frequency bands as observed on the two-dimensional coordinate system that shows signal point locations is recognized, and the data corresponding to that midpoint coordinate position is used as the data for that subcarrier. However, data synthesis may be achieved in any other manner. For example, the data synthesis circuit may be so configured as to generate the data for the individual subcarriers in the parallel data by evaluating the relationship between the coordinate positions of the two points corresponding to the two signals received in different frequency bands and the coordinate position obtained when reception is normal as observed on the two-dimensional coordinate system that shows signal point locations and then adding those points together with appropriate weights given thereto so as to integrate them together.

Third Embodiment

Figure 7:
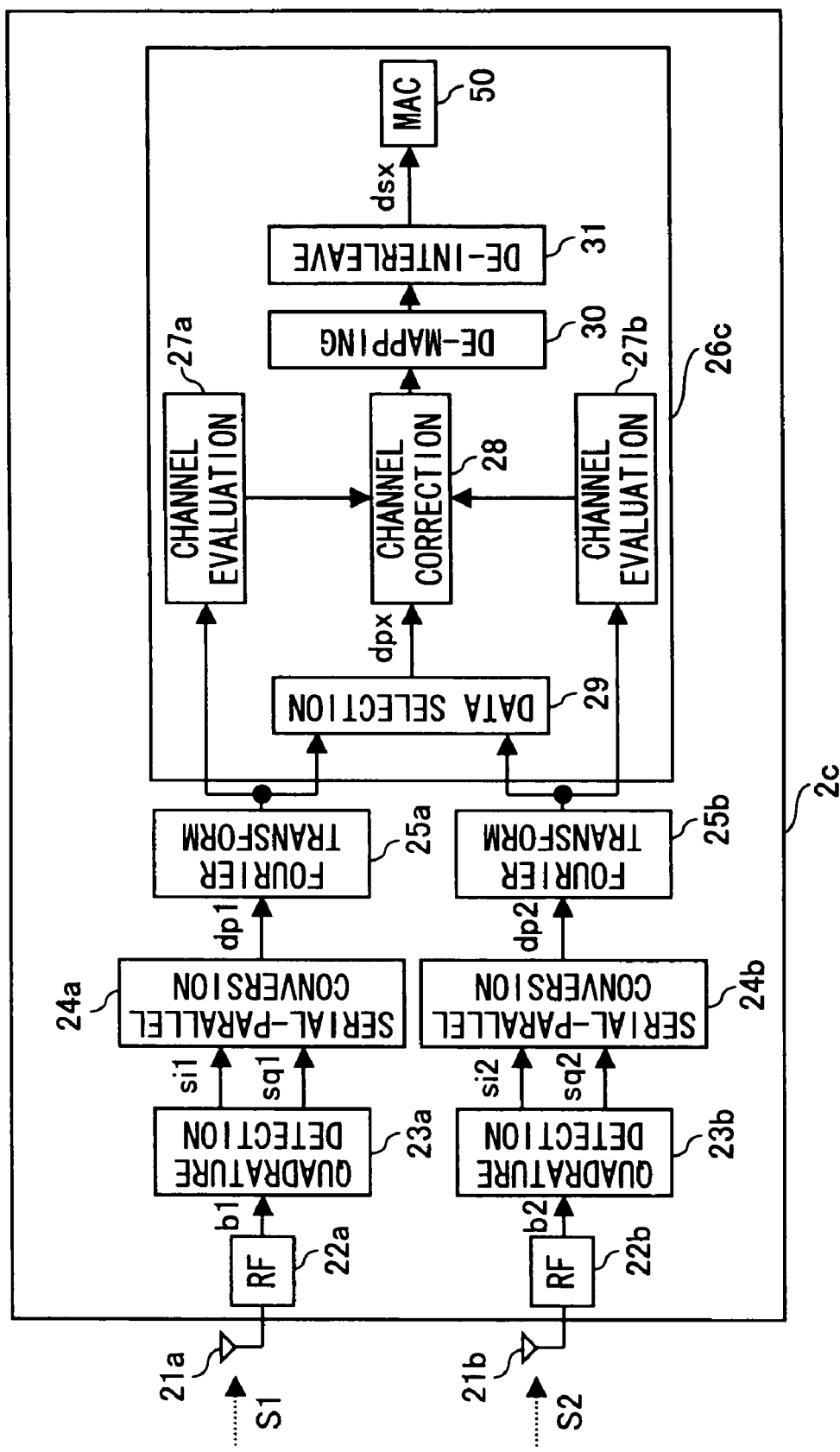
FIG. 7 is a block diagram showing the configuration of the data reception apparatus of a third embodiment of the invention.

A third embodiment of the invention will be described below with reference to the drawings. FIG. 7 is a block diagram showing the internal configuration of the data reception apparatus used in the wireless communication system of this embodiment. In the data reception apparatus shown in FIG. 7, such blocks as serve the same purposes as in the data reception apparatus shown in FIG. 2 are identified with the same reference numerals, and their detailed explanations will not be repeated.

In the data reception apparatus 2c shown in FIG. 7 (corresponding to the data reception apparatus 2 shown in FIG. 1), the subcarrier selection/demodulation circuit 26c (corresponding to the subcarrier selection/demodulation circuit 26 shown in FIG. 1) is so configured that the parallel data "dp1" and "dp2" form the Fourier transform circuits 25a and 25b is fed to the data selection circuit 29, and is provided with, in place of the channel correction circuits 28a and 28b, a channel correction circuit 28 that receives the parallel data "dpx" outputted from the data selection circuit 29. In other respects, the data reception apparatus 2c of this embodiment is provided with the same blocks as those provided in the data reception apparatus 2a (FIG. 2) of the first embodiment.

Configured as described above, this data reception apparatus 2c operates as follows. First, as in the data reception apparatus 2a of the first embodiment, a high-frequency signal "S1" in the 2.4 GHz band and a high-frequency signal "S2" in the 5.2 GHz band received via the antennas 21a and 21b are, through the RF circuits 22a and 22b, quadrature detection circuits 23a and 23b, serial-to-parallel conversion circuits 24a and 24b, and Fourier transform circuits 25a and 25b, converted into parallel data "dp1" and "dp2," which is then fed to the subcarrier selection/demodulation circuit 26c.

In the subcarrier selection/demodulation circuit 26c, the channel evaluation circuits 27a and 27b, which respectively receive the parallel data "dp1" and "dp2," generate influence correction information for each subcarrier in the same manner as in the first embodiment. As opposed to the subcarrier selection/demodulation circuit 26a of the first embodiment, however, here, the data selection circuit 29 receives from the Fourier transform circuits 25a and 25b the parallel data "dp1" and "dp2" that is not yet corrected with respect to each subcarrier. The data selection circuit 29 operates in the same manner as in the first embodiment, and accordingly the data that has constellation information closer to that obtained when reception is normal is selected to generate parallel data "dpx."

The parallel data "dpx" thus generated is then fed to the channel correction circuit 28. For this parallel data "dpx," the channel correction circuit 28 selects, with respect to each subcarrier, appropriate influence correction information from the channel evaluation circuits 27a and 27b, and then, on the basis of the thus selected influence correction information, performs data correction. Here, for those subcarriers for which the data in the parallel data "dp1" is selected by the data selection circuit 29, data correction is performed on the basis of the influence correction information from the channel evaluation circuit 27a, and for those subcarriers for which the data in the parallel data "dp2" is selected by the data selection circuit 29, data correction is performed on the basis of the influence correction information from the channel evaluation circuit 27b.

Here, the data correction operation performed by the channel correction circuit 28 is the same as the data correction operation performed by the channel correction circuits 28a and 28b in the first embodiment. The parallel data "dpx" thus corrected with respect to each subcarrier is then, through the de-mapping circuit 30 and the de-interleave circuit 31, converted into serial data "dsx," which is then outputted.

Fourth Embodiment

Figure 8:
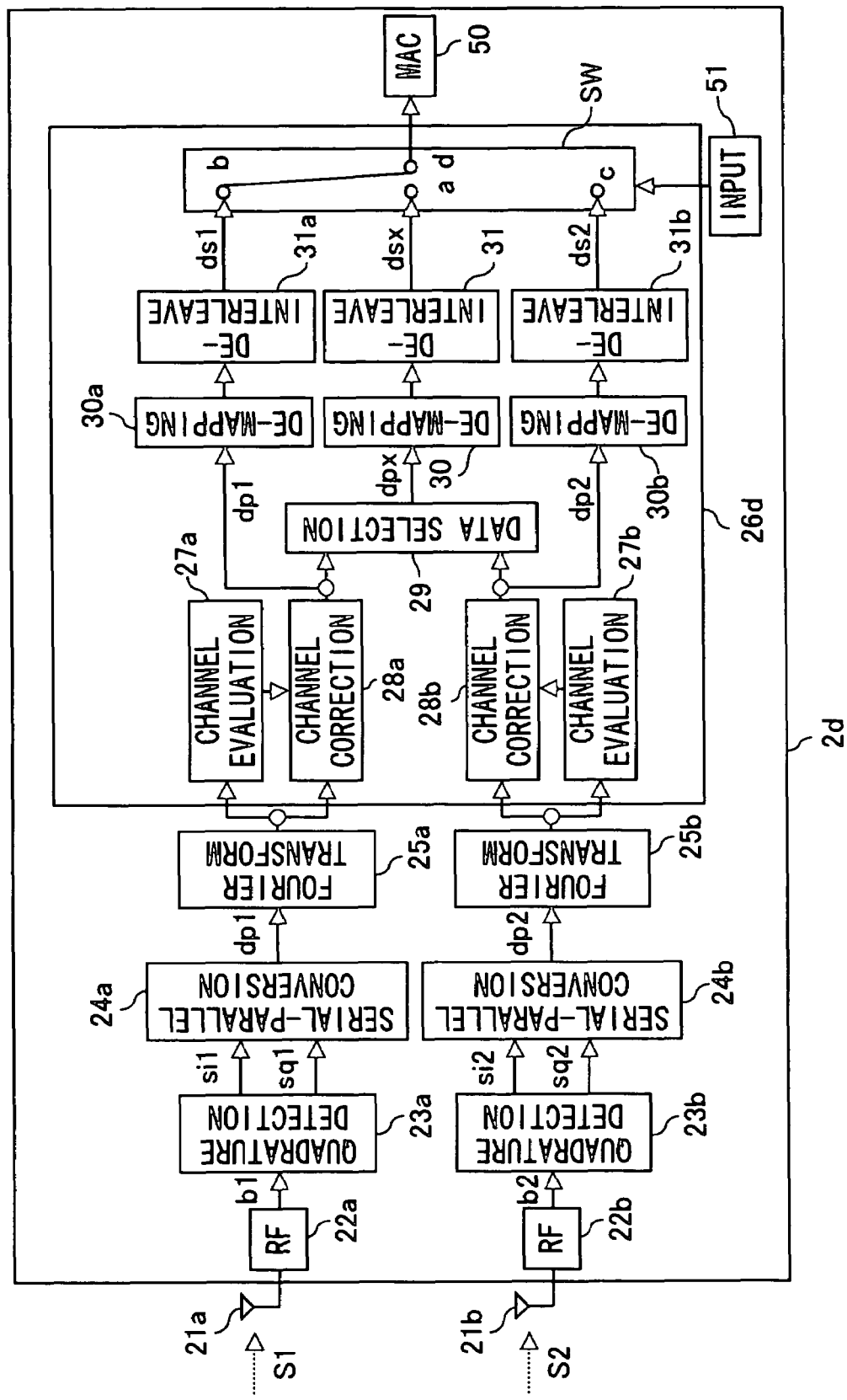
FIG. 8 is a block diagram showing the configuration of the data reception apparatus of a fourth embodiment of the invention.

A fourth embodiment of the invention will be described below with reference to the drawings. FIG. 8 is a block diagram showing the internal configuration of the data reception apparatus used in the wireless communication system of this embodiment. In the data reception apparatus shown in FIG. 8, such blocks as serve the same purposes as in the data reception apparatus shown in FIG. 2 are identified with the same reference numerals, and their detailed explanations will not be repeated.

In the data reception apparatus 2d shown in FIG. 8 (corresponding to the data reception apparatus 2 shown in FIG. 1), the subcarrier selection/demodulation circuit 26d (corresponding to the subcarrier selection/demodulation circuit 26 shown in FIG. 1), as compared with the subcarrier selection/demodulation circuit 26a (FIG. 2), is additionally provided with: de-mapping circuits 30a and 30b that de-map the parallel data "dp1" and "dp2" of which the individual subcarriers have been corrected by the channel correction circuits 28a and 28b, respectively; de-interleave circuits 31a and 31b that de-interleave the parallel data "dp1" and "dp2" demodulated by the de-mapping circuits 30a and 30b; and a selector switch SW that selects among the different sets of serial data "dsx," "ds1," and "ds2" outputted from the de-interleave circuits 31, 31a, and 31b, respectively, for output to the MAC section 50. Furthermore, the data reception apparatus 2d is provided with an input section 51 that controls the switching of the selection switch SW. In other respects, the data reception apparatus 2d of this embodiment is provided with the same blocks as those provided in the data reception apparatus 2a (FIG. 2) of the first embodiment.

In the data reception apparatus 2d configured as described above, the RF circuits 22a and 22b, quadrature detection circuits 23a and 23b, serial-to-parallel conversion circuits 24a and 24b, and Fourier transform circuits 25a and 25b operate in the same manner as in the first embodiment. Moreover, in the subcarrier selection/demodulation circuit 26d, the channel evaluation circuits 27a and 27b, channel correction circuits 28a and 28b, data selection circuit 29, de-mapping circuit 30, and de-interleave circuit 31 operate in the same manner as in the first embodiment. Accordingly, high-frequency signals "S1" and "S2" received via the antennas 21a and 21b are converted into parallel data "dp1" and "dp2," then, for each subcarrier, the data in good condition is selected to generate parallel data "dpx," and then, on the basis of this parallel data "dpx," serial data "dsx" is generated.

The de-mapping circuit 30a receives the parallel data "dp1" that has been corrected with respect to each subcarrier by the channel correction circuit 28a. The de-mapping circuit 30a performs de-mapping on this parallel data "dp1" for each subcarrier, and then feeds the result to the de-interleave circuit 31a. The de-interleave circuit 31a performs de-interleaving on the parallel data "dp1" demodulated by the de-mapping circuit 30a to generate serial data "ds1."

The de-mapping circuit 30b receives the parallel data "dp2" that has been corrected with respect to each subcarrier by the channel correction circuit 28b. The de-mapping circuit 30b performs de-mapping on this parallel data "dp2" for each subcarrier, and then feeds the result to the de-interleave circuit 31b. The de-interleave circuit 31b performs de-interleaving on the parallel data "dp2" demodulated by the de-mapping circuit 30b to generate serial data "ds2."

Then, the serial data "dsx," "ds1," and "ds2" outputted from the de-interleave circuits 31, 31a, and 31b is fed to the contacts "a," "b," and "c" of the selection switch SW. At this time, a control signal is fed to the selection switch SW according to how the input section 51 is operated so that one of the contacts "a," "b," and "c" is connected to the contact "d" at a time. Specifically, when communication is being performed in both the 2.4 GHz and 5.2 GHz frequency bands, the contact "a" of the selection switch SW is selected; when communication is being performed in the 2.4 GHz frequency band only, the contact "b" of the selection switch SW is selected; and, when communication is being performed in the 5.2 GHz frequency band only, the contact "c" of the selection switch SW is selected.

Accordingly, when communication is being performed in both the 2.4 GHz and 5.2 GHz frequency bands, the serial data "dsx" from the de-interleave circuit 31 is fed through the selection switch SW to the MAC section 50; when communication is being performed in the 2.4 GHz frequency band only, the serial data "ds1" from the de-interleave circuit 31a is fed through the selection switch SW to the MAC section 50; and, when communication is being performed in the 5.2 GHz frequency band only, the serial data "ds2" from the de-interleave circuit 31b is fed through the selection switch SW to the MAC section 50.

The configuration of this embodiment can be realized by additionally providing, in a conventional data reception apparatus that permits selection between the IEEE802.11a and IEEE802.11b methods, a data selection circuit 29, a de-mapping circuit 30, and a de-interleave circuit 31, and by using a selector switch SW that permits selection of one among three signals as a selector switch for selecting among those different methods. Thus, the data reception apparatus of this embodiment can be realized more easily than a conventional data reception apparatus that can receive and demodulate signals in a plurality of frequency bands.

Figure 9:
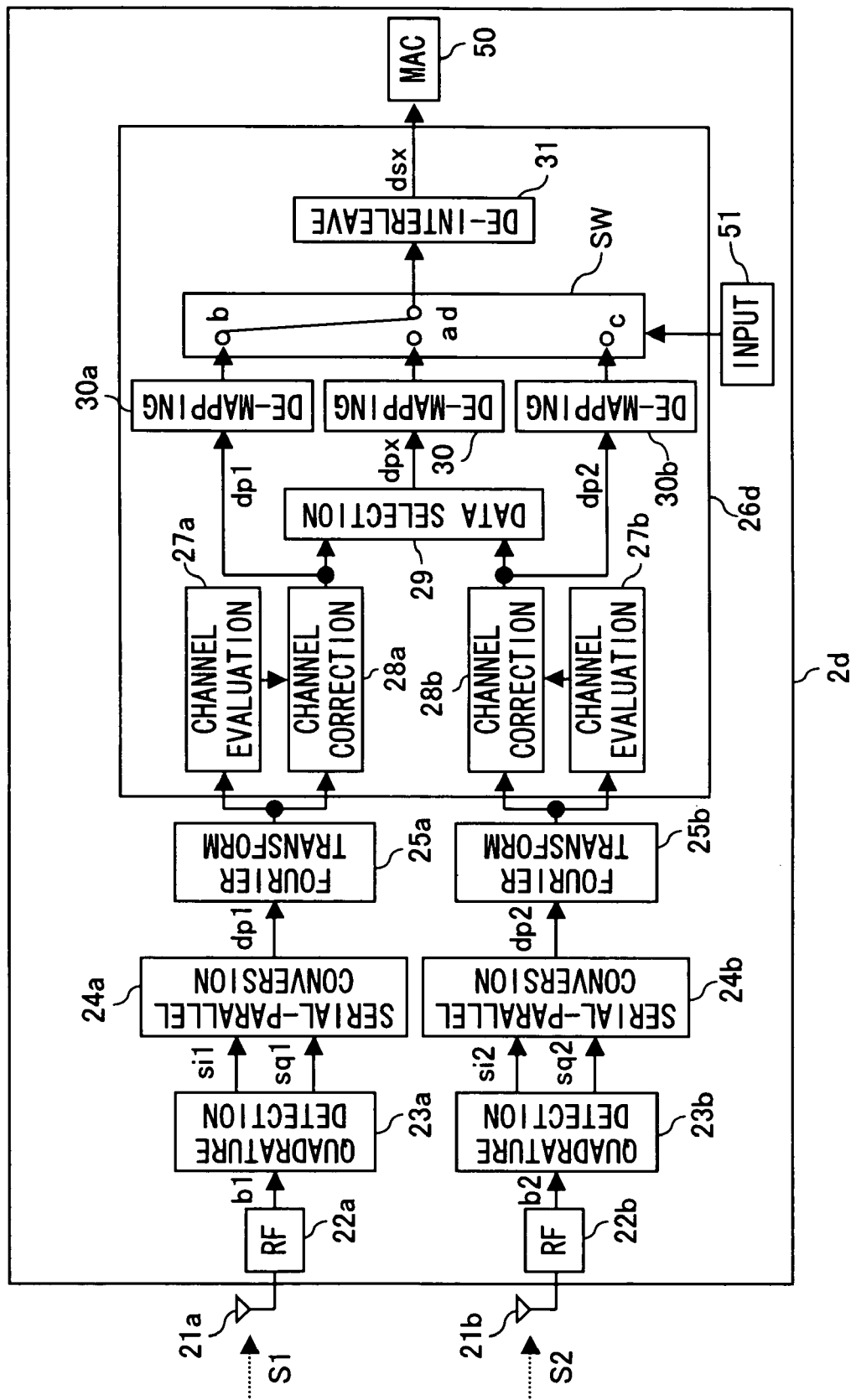
FIG. 9 is a block diagram showing another example of the configuration of the data reception apparatus of the fourth embodiment.
Figure 10:
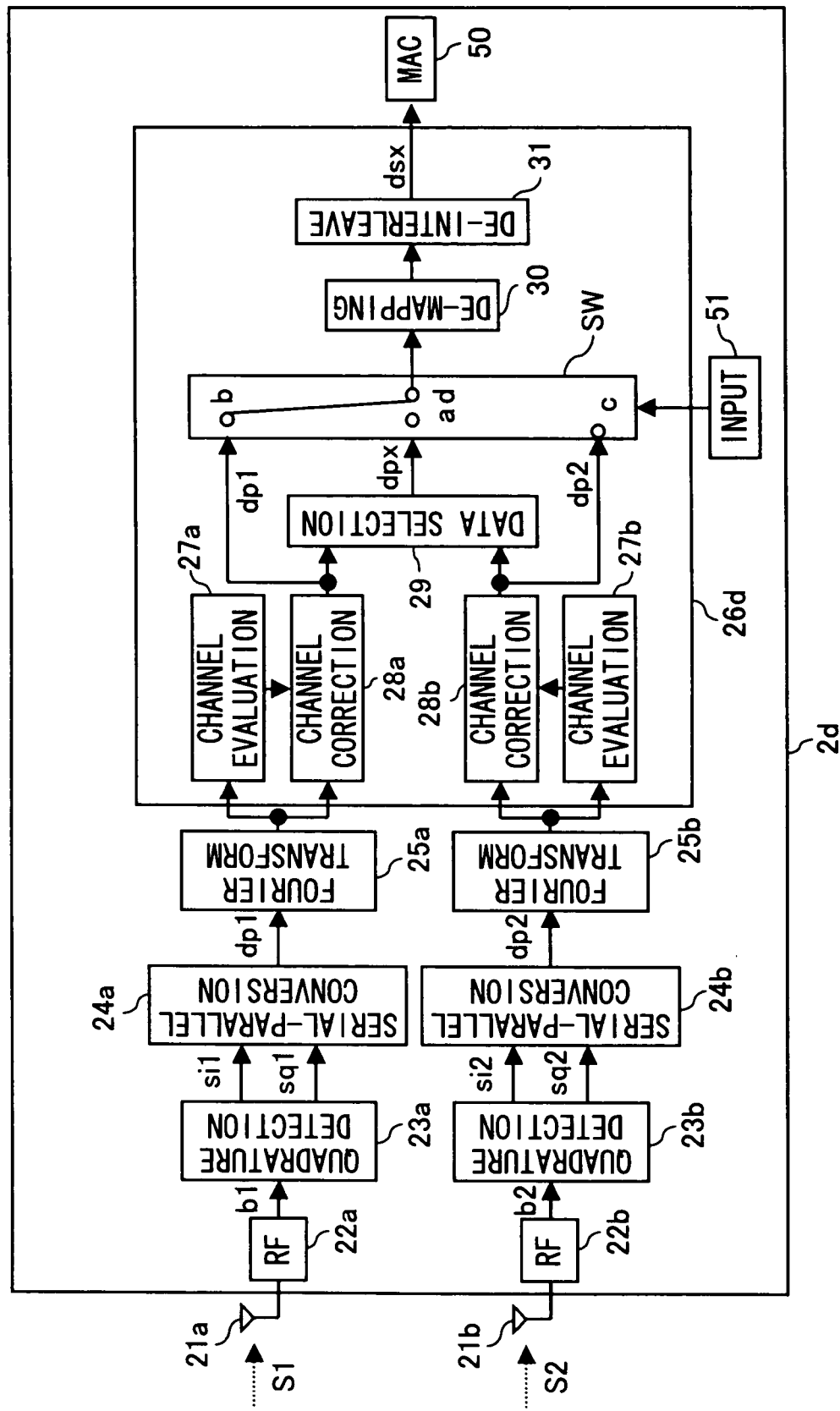
FIG. 10 is a block diagram showing still another example of the configuration of the data reception apparatus of the fourth embodiment.

In this embodiment, the selection switch SW selects among the signals from de-interleave circuits 31, 31a, and 31b. However, it is also possible, as shown in FIG. 9, to make the selection switch SW select among the signals from the de-mapping circuit 30, 30a, and 30b so that only one de-interleave circuit 31 is needed. Alternatively, it is possible, as shown in FIG. 10, to make the selection switch SW select among the signals from the channel correction circuits 28a and 28b and the data selection circuit 29 so that only one de-mapping circuit 30 and only one de-interleave circuit 31 are needed.

Fifth Embodiment

Figure 11:
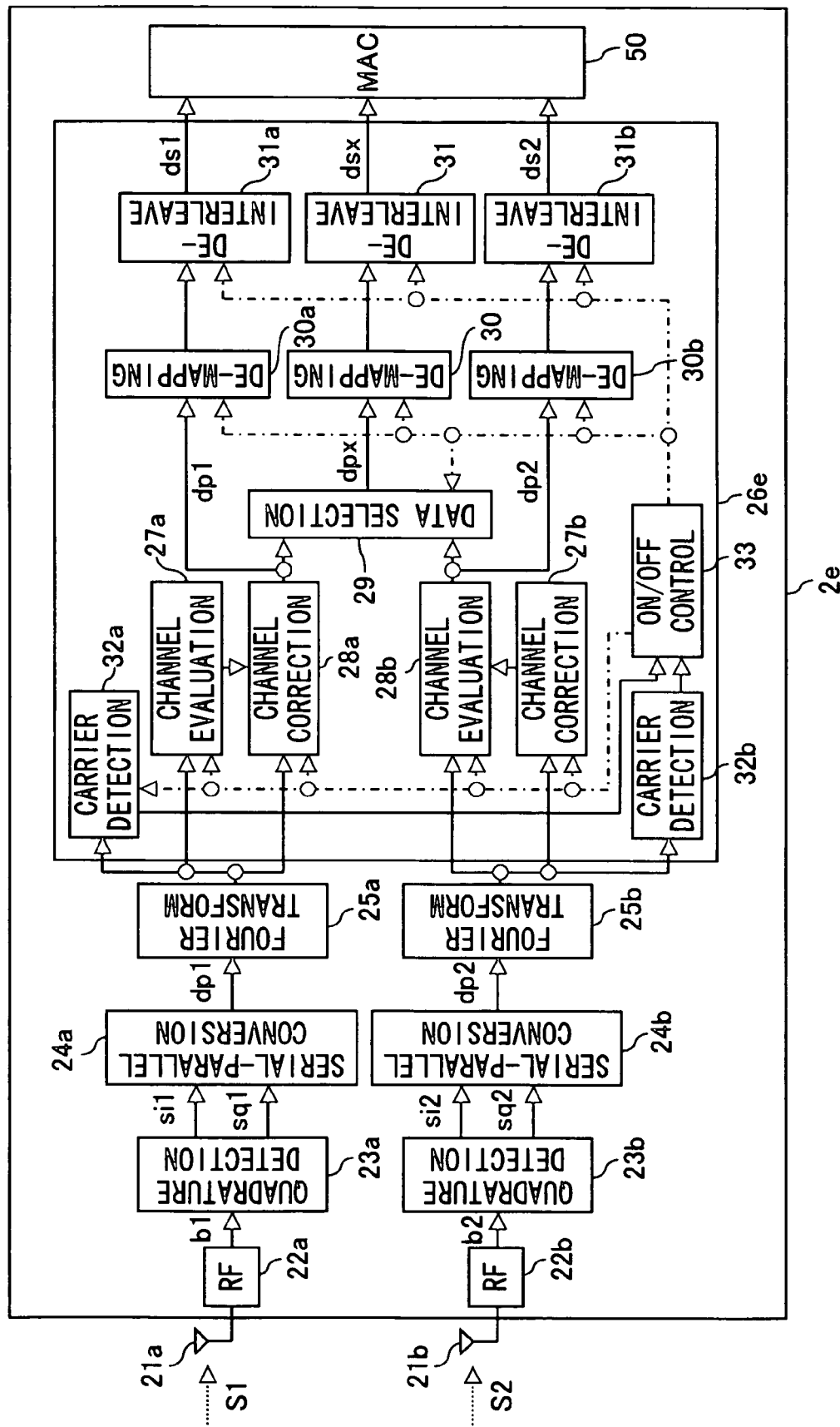
FIG. 11 is a block diagram showing the configuration of the data reception apparatus of a fifth embodiment of the invention.

A fifth embodiment of the invention will be described below with reference to the drawings. FIG. 11 is a block diagram showing the internal configuration of the data reception apparatus used in the wireless communication system of this embodiment. In the data reception apparatus shown in FIG. 11, such blocks as serve the same purposes as in the data reception apparatus shown in FIG. 8 are identified with the same reference numerals, and their detailed explanations will not be repeated.

In the data reception apparatus 2e shown in FIG. 11 (corresponding to the data reception apparatus 2 shown in FIG. 1), the subcarrier selection/demodulation circuit 26e (corresponding to the subcarrier selection/demodulation circuit 26 shown in FIG. 1), as compared with the subcarrier selection/demodulation circuit 26d (FIG. 8), is additionally provided with: carrier detection circuits 32a and 32b that check the reception condition in the 2.4 GHz and 5.2 GHz bands, respectively, as known from the received electric power on the basis of the parallel data "dp1" and "dp2" outputted from the Fourier transform circuits 25a and 25b, respectively; and an ON/OFF control circuit 33 that turns on and off the individual blocks within the subcarrier selection/demodulation circuit 26e. The data reception apparatus 2e does not include the input section 51 and the selection switch SW provided in the fourth embodiments. In other respects, the data reception apparatus 2e of this embodiment is provided with the same blocks as those provided in the data reception apparatus 2d of the fourth embodiment.

In the data reception apparatus 2e configured as described above, when the parallel data "dp1" from the Fourier transform circuit 25a is fed to the carrier detection circuit 32a, for each subcarrier, the received electric power or the like is checked to check the reception condition in the 2.4 GHz frequency band. When the parallel data "dp2" from the Fourier transform circuit 25b is fed to the carrier detection circuit 32b, for each subcarrier, the received electric power or the like is checked to check the reception condition in the 5.2 GHz frequency band.

Then, the ON/OFF control circuit 33 is notified of the reception condition in the 2.4 GHz and 5.2 GHz bands as recognized by the carrier detection circuits 32a and 32b. Then, if the carrier detection circuits 32a and 32b recognize good reception condition in both the 2.4 GHz and 5.2 GHz bands, the ON/OFF control circuit 33 turns off the de-mapping circuits 30a and 30b and de-interleave circuits 31a and 31b, and turns on the channel evaluation circuits 27a and 27b, channel correction circuits 28a and 28b, data selection circuit 29, de-mapping circuit 30, and de-interleave circuit 31. As a result of this operation, the serial data "dsx" from the de-interleave circuit 31 is outputted to the MAC section 50.

If the carrier detection circuits 32a and 32b recognize good reception condition in the 2.4 GHz band but poor reception condition in the 5.2 GHz band, the ON/OFF control circuit 33 turns off the channel evaluation circuit 27b, channel correction circuit 28b, data selection circuit 29, de-mapping circuits 30 and 30b, and de-interleave circuits 31 and 31b, and turns on the channel evaluation circuit 27a, channel correction circuit 28a, de-mapping circuit 30a, and de-interleave circuit 31a. As a result of this operation, the serial data "ds1" from the de-interleave circuit 31a is outputted to the MAC section 50.

If the carrier detection circuits 32a and 32b recognize poor reception condition in the 2.4 GHz band but good reception condition in the 5.2 GHz band, the ON/OFF control circuit 33 turns off the channel evaluation circuit 27a, channel correction circuit 28a, data selection circuit 29, de-mapping circuits 30 and 30a, and de-interleave circuits 31 and 31a, and turns on the channel evaluation circuit 27b, channel correction circuit 28b, de-mapping circuit 30b, and de-interleave circuit 31b. As a result of this operation, the serial data "ds2" from the de-interleave circuit 31b is outputted to the MAC section 50.

With the configuration of this embodiment, it is possible to turn the individual blocks on and off according to the reception condition in the individual frequency bands so that only the necessary blocks operate. This makes it possible to turn the unnecessary blocks off, and thus helps reduce power consumption as compared with the fifth embodiment.

Figure 12:
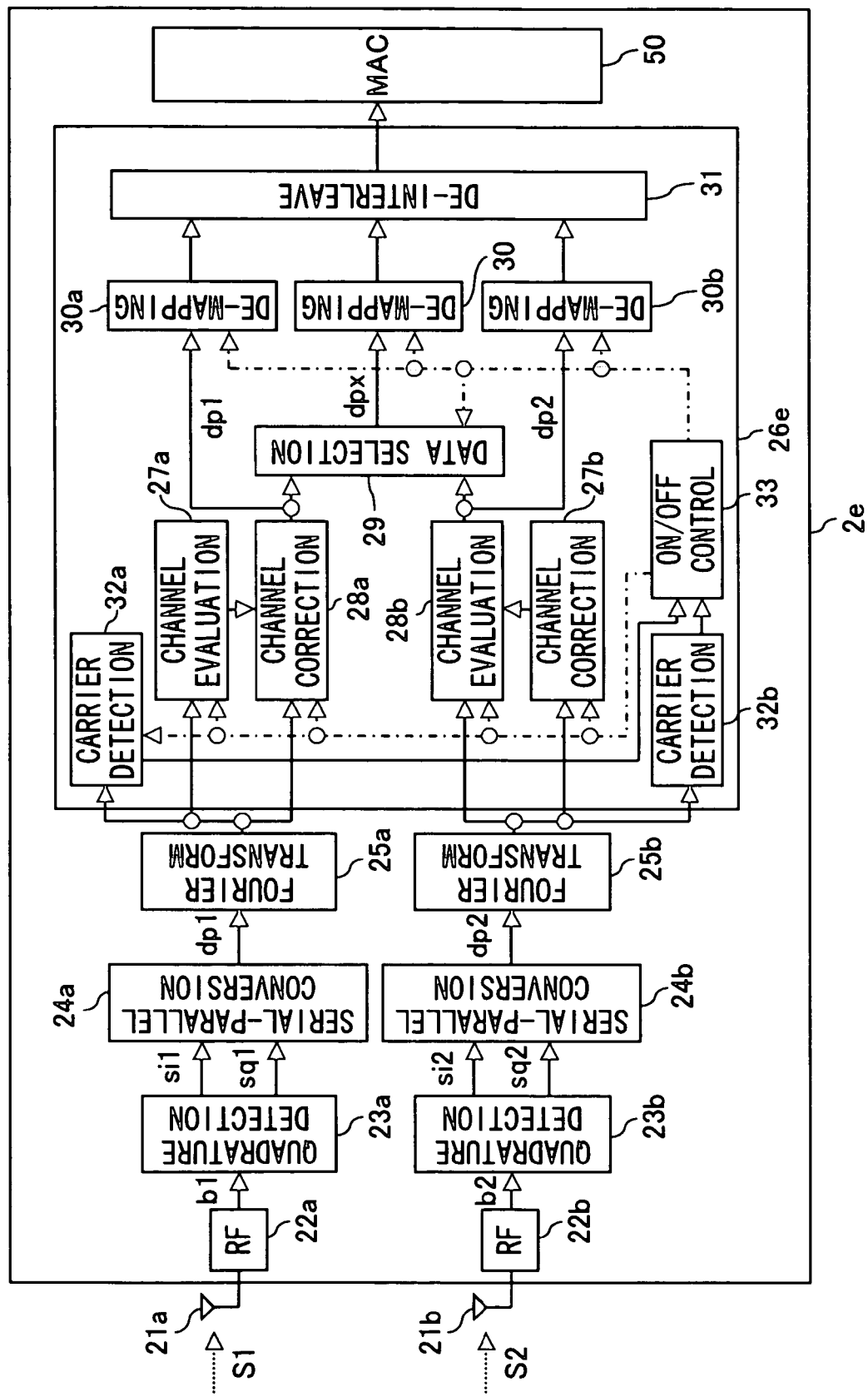
FIG. 12 is a block diagram showing another example of the configuration of the data reception apparatus of the fifth embodiment.
Figure 13:
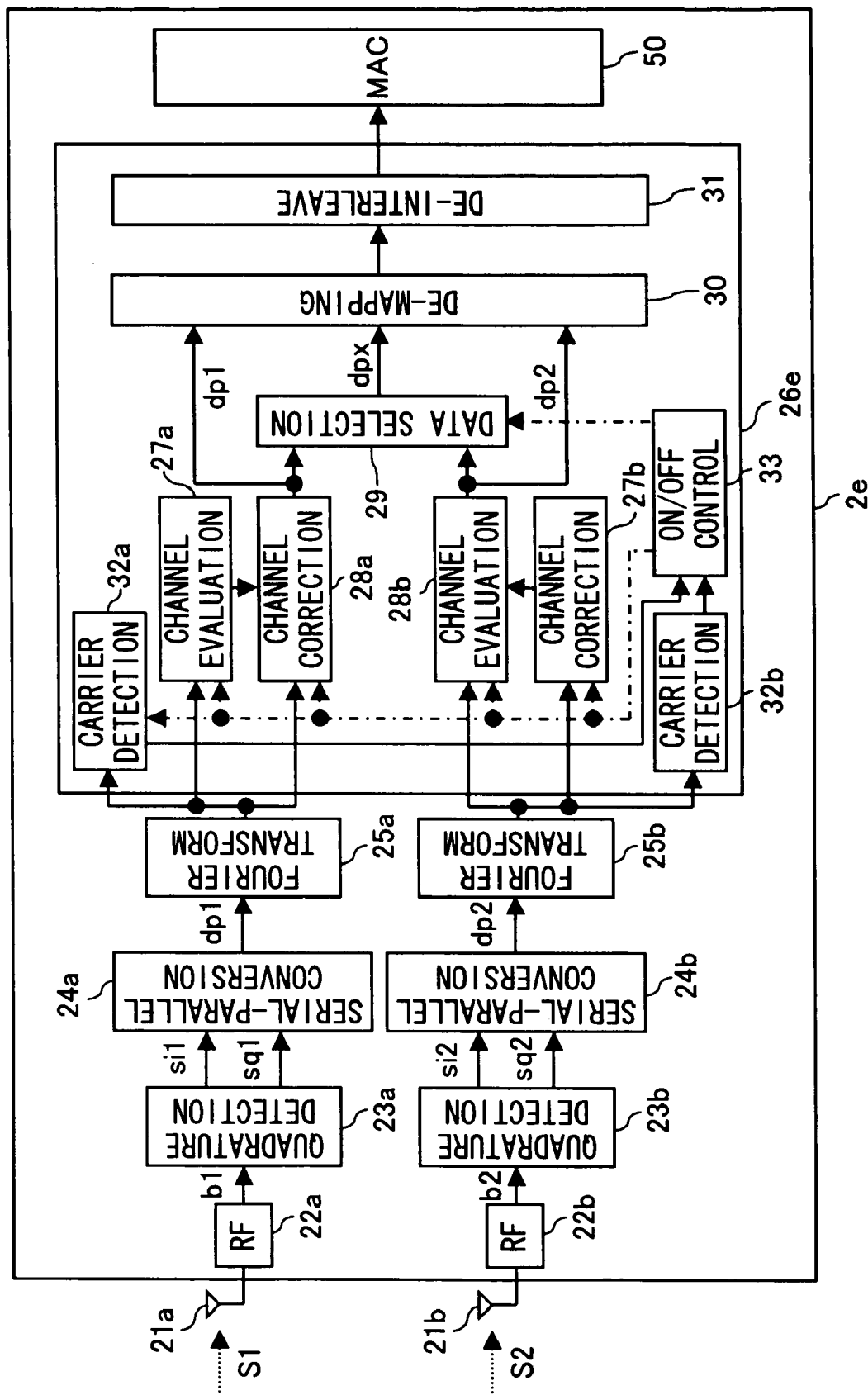
FIG. 13 is a block diagram showing still another example of the configuration of the data reception apparatus of the fifth embodiment.

In this embodiment, it is also possible, as shown in FIG. 12, to use only one de-interleave circuit 31 and feed the parallel data "dpx", "dp1," and "dp2" from the de-mapping circuits 30, 30a, and 30b to the de-interleave circuit 31. Alternatively, it is possible, as shown in FIG. 13, to use only one de-mapping circuit 30 and only one de-interleave circuit 31 and feed the parallel data "dpx," "dp1," and "dp2" from the data selection circuit 29 and the channel correction circuits 28a and 28b to the de-mapping circuit 30.

In the fifth and sixth embodiments, the subcarrier selection/demodulation circuit 26d or 26e may be provided with, in place of the data selection circuit 29, a data synthesis circuit 29a as in the second embodiment. In the embodiments described above, it is assumed that two frequency bands, namely 2.4 GHz and 5.2 GHz frequency bands, are used as the carrier frequency bands. It is, however, also possible to use any other frequency bands than the two specifically mentioned above, and even to use three or more frequency bands as the carrier frequency bands. Moreover, in the data reception apparatus, each RF circuit may be provided with a diversity antenna consisting of a plurality of antennas so that, for each RF circuit, whichever of the antennas gives good reception condition is selected.

According to the present invention, it is possible to transmit data signals containing identical data in different carrier frequency bands. Thus, when those data signals are received, it is possible to select the data signal in whichever of the carrier frequency bands gives good reception condition. Moreover, by synthesizing together those data signals, it is possible to obtain a data signal closer to one received in better reception condition. Moreover, in a case where the OFDM method is used, by selecting good data for each subchannel, it is possible to reduce the influence of frequency-selective fading that tends to affect a particular frequency band. Moreover, in a case where the OFDM method is used, by synthesizing data for each subchannel, it is possible to reduce the influence of frequency-selective fading that tends to affect a particular frequency band. Moreover, by turning off the blocks that process data signals in a frequency band in which communication is not currently being performed, it is possible to reduce the power consumption of the wireless communication apparatus as a whole.

What is claimed is:

1. A wireless communication apparatus comprising:
n (where n is an integer equal to or greater than 2) antennas, each receiving a data signal modulated by an OFDM modulation method and transmitted in one of n carrier frequency bands;
n frequency conversion circuits that convert the data signals received respectively via the n antennas into baseband signals having an identical frequency;
n Fourier transform circuits that, based on the plurality of baseband signals obtained respectively from the n frequency conversion circuits, generate parallel data containing data segments each relating to one of m (where m is an integer equal to or greater than 2) subcarriers;
n data correction circuits that, based on the parallel data fed respectively from the n Fourier transform circuits, check reception condition of each of the m subcarriers in the respective carrier frequency bands and accordingly correct the parallel data;
a data selection circuit that receives the n sets of parallel data corrected by the n data correction circuits and that then, for each of the m subcarriers, recognizes the carrier frequency band in which reception condition is best and that then selects the data in the thus recognized carrier frequency band so as to thereby newly generate parallel data containing m data segments; and
a demodulation circuit that converts the parallel data newly generated by the data selection circuit into serial data, wherein
the parallel data contained in the data signals transmitted respectively in the plurality of carrier frequency bands contains identical data, and
the demodulation circuit demodulates parallel data selected from n+1 sets of parallel data including the parallel data corrected by the n data correction circuits and the parallel data newly generated by the data selection circuit.

2. The wireless communication apparatus according to claim 1, further comprising:
a carrier detector that, based on the parallel data corrected respectively by the n data correction circuits, checks reception condition in the n carrier frequency bands to recognize an unused one of the carrier frequency bands; and
an ON/OFF control circuit that turns off, among the n data correction circuits, the data correction circuit that corrects the parallel data corresponding to the data signal in the carrier frequency band recognized as being unused by the carrier detector and that, when only one of the carrier frequency band is recognized as being used, turns off the data selection circuit.

3. A wireless communication apparatus comprising:
n (where n is an integer equal to or greater than 2) antennas, each receiving a data signal modulated by an OFDM modulation method and transmitted in one of n carrier frequency bands;
n frequency conversion circuits that convert the data signals received respectively via the n antennas into baseband signals having an identical frequency;
n Fourier transform circuits that, based on the plurality of baseband signals obtained respectively from the n frequency conversion circuits, generate parallel data containing data segments each relating to one of m (where m is an integer equal to or greater than 2) subcarriers;
n data correction circuits that, based on the parallel data fed respectively from the n Fourier transform circuits, check reception condition of each of the m subcarriers in the respective carrier frequency bands and accordingly correct the parallel data;

a data synthesis circuit that receives the n sets of parallel data corrected by the n data correction circuits and that then, for each of the m subcarriers, synthesizes the data so as to thereby newly generate parallel data containing m data segments; and a demodulation circuit that converts the parallel data newly generated by the data synthesis circuit into serial data, wherein the parallel data contained in the data signals transmitted respectively in the plurality of carrier frequency bands contains identical data, and the demodulation circuit demodulates parallel data selected from n+1 sets of parallel data including the parallel data corrected by the n data correction circuits and the parallel data newly generated by the data synthesis circuit.

4. The wireless communication apparatus according to claim 3, further comprising:

a carrier detector that, based on the parallel data corrected respectively by the n data correction circuits, checks reception condition in the n carrier frequency bands to recognize an unused one of the carrier frequency bands; and an ON/OFF control circuit that turns off, among the n data correction circuits, the data correction circuit that corrects the parallel data corresponding to the data signal in the carrier frequency band recognized as being unused by the carrier detector and that, when only one of the carrier frequency band is recognized as being used, turns off the data synthesis circuit.

5. A wireless communication system comprising:

a data transmission apparatus built with the including a wireless communication apparatus comprising:

a modulation circuit that generates a plurality of data signals containing identical data each in one of a plurality of carrier frequency bands; and a plurality of antennas via which the plurality of data signals outputted from the modulation circuit are transmitted each in a corresponding one of the plurality of carrier frequency bands, wherein the modulation circuit comprises:

a modulator that generates a baseband signal by modulating the data by a predetermined modulation method; and a plurality of frequency converters that convert the baseband signal generated by the modulator respectively into the data signals in the corresponding carrier frequency bands; and the predetermined modulation method used by the modulator is an OFDM method; and a data reception apparatus including a wireless communication apparatus comprising:

n (where n is an integer equal to or greater than 2) antennas, each receiving a data signal modulated by an OFDM modulation method and transmitted in one of n carrier frequency bands;

n frequency conversion circuits that convert the data signals received respectively via the n antennas into baseband signals having an identical frequency;

n Fourier transform circuits that, based on the plurality of baseband signals obtained respectively from the n frequency conversion circuits, generate parallel data containing data segments each relating to one of m (where m is an integer equal to or greater than 2) subcarriers;

n data correction circuits that, based on the parallel data fed respectively from the n Fourier transform circuits, check reception condition of each of the m subcarriers in the respective carrier frequency bands and accordingly correct the parallel data;

a data selection circuit that receives the n sets of parallel data corrected by the n data correction circuits and that then, for each of the m subcarriers, recognizes the carrier frequency band in which reception condition is best and that then selects the data in the thus recognized carrier frequency band so as to thereby newly generate parallel data containing m data segments; and a demodulation circuit that converts the parallel data newly generated by the data selection circuit into serial data, wherein the parallel data contained in the data signals transmitted respectively in the plurality of carrier frequency bands contains identical data, and the demodulation circuit demodulates parallel data selected from n+1 sets of parallel data including the parallel data corrected by the n data correction circuits and the parallel data newly generated by the data selection circuit, wherein a plurality of data signals containing identical data are transmitted and received in the plurality of carrier frequency bands.

6. A wireless communication system comprising:

a data transmission apparatus including a wireless communication apparatus comprising:

a modulation circuit that generates a plurality of data signals containing identical data each in one of a plurality of carrier frequency bands; and a plurality of antennas via which the plurality of data signals outputted from the modulation circuit are transmitted each in a corresponding one of the plurality of carrier frequency bands, wherein the modulation circuit comprises:

a modulator that generates a baseband signal by modulating the data by a predetermined modulation method; and a plurality of frequency converters that convert the baseband signal generated by the modulator respectively into the data signals in the corresponding carrier frequency bands, and the predetermined modulation method used by the modulator is an OFDM method; and a data reception apparatus including a wireless communication apparatus comprising:

n (where n is an integer equal to or greater than 2) antennas, each receiving a data signal modulated by an OFDM modulation method and transmitted in one of n carrier frequency bands;

n frequency conversion circuits that convert the data signals received respectively via the n antennas into baseband signals having an identical frequency;

n Fourier transform circuits that, based on the plurality of baseband signals obtained respectively from the n frequency conversion circuits, generate parallel data containing data segments each relating to one of m (where in is an integer equal to or greater than 2) subcarriers;

n data correction circuits that, based on the parallel data fed respectively from the n Fourier transform circuits, check reception condition of each of the m subcarriers in the respective carrier frequency bands and accordingly correct the parallel data;

a data synthesis circuit that receives the n sets of parallel data corrected by the n data correction circuits and that then, for each of the m subcarriers, synthesizes the data so as to thereby newly generate parallel data containing in data segments; and a demodulation circuit that converts the parallel data newly generated by the data synthesis circuit into serial data, wherein the parallel data contained in the data signals transmitted respectively in the plurality of carrier frequency bands contains identical data, and the demodulation circuit demodulates parallel data selected from n+1 sets of parallel data including the parallel data corrected by the n data correction circuits and the parallel data newly generated by the data synthesis circuit, wherein a plurality of data signals containing identical data are transmitted and received in the plurality of carrier frequency bands.

* * * * *